US006288172B1

(12) United States Patent
Goetz et al.

(10) Patent No.: US 6,288,172 B1
(45) Date of Patent: *Sep. 11, 2001

(54) LIGHT DIFFUSING ADHESIVE

(75) Inventors: Richard J. Goetz; Andrew J. Ouderkirk, both of Woodbury, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,481

(22) Filed: May 6, 1997

Related U.S. Application Data

(63) Continuation of application No. 08/565,111, filed on Nov. 30, 1995, now abandoned.
(60) Provisional application No. 60/000,512, filed on Jun. 26, 1995.

(51) Int. Cl.[7] .......................... C08F 214/18; C09J 127/00
(52) U.S. Cl. .......................... 525/200; 525/227; 525/206; 525/228
(58) Field of Search .................... 525/200, 227, 525/228, 206

(56) References Cited

U.S. PATENT DOCUMENTS

| Re. 34,605 | 5/1994 | Schrenk et al. ............... 359/359 |
| 3,610,729 | 10/1971 | Rogers .......................... 350/157 |
| 3,647,612 | 3/1972 | Schrenk et al. ............... 161/165 |
| 3,711,176 | 1/1973 | Alfrey, Jr. et al. ............. 350/1 |
| 3,759,647 | 9/1973 | Schrenk et al. ............... 425/131 |
| 3,771,245 * | 11/1973 | Mabrey et al. ................ 40/106.1 |
| 3,773,882 | 11/1973 | Schrenk ........................ 264/171 |
| 3,801,429 | 4/1974 | Schrenk et al. ............... 161/181 |
| 4,094,947 | 6/1978 | Alfrey, Jr. et al. ............. 264/171 |
| 4,166,152 | 8/1979 | Baker et al. . |
| 4,268,127 | 1/1981 | Oshima et al. . |
| 4,310,584 | 1/1982 | Cooper et al. ................. 428/212 |
| 4,446,305 | 5/1984 | Rogers et al. ................. 528/348 |
| 4,495,318 | 1/1985 | Howard . |
| 4,520,189 | 5/1985 | Rogers et al. ................. 528/331 |
| 4,521,588 | 6/1985 | Rogers et al. ................. 528/363 |
| 4,525,413 | 6/1985 | Rogers et al. ................. 428/212 |
| 4,525,537 * | 6/1985 | Kamada ........................ 525/198 |
| 4,540,623 | 9/1985 | Im et al. ...................... 428/220 |
| 4,720,426 | 1/1988 | Englert et al. ................. 428/344 |
| 4,855,170 * | 8/1989 | Darvell et al. ................. 428/40 |
| 4,920,720 * | 5/1990 | La Branke ..................... 52/506 |
| 4,931,347 | 6/1990 | Slovinsky et al. . |
| 4,937,134 | 6/1990 | Schrenk et al. ............... 428/213 |
| 4,996,110 * | 2/1991 | Tanuma ........................ 428/344 |
| 5,031,773 * | 7/1991 | Manico et al. ................ 206/455 |
| 5,045,569 | 9/1991 | Delgado . |
| 5,089,318 | 2/1992 | Shetty et al. .................. 428/212 |
| 5,094,788 | 3/1992 | Schrenk et al. ............... 264/171 |

(List continued on next page.)

FOREIGN PATENT DOCUMENTS

| 1327286 | 3/1994 | (CA) . |
| 062751 | 10/1982 | (EP) . |
| 469732 | 7/1991 | (EP) . |
| 514223 | 5/1992 | (EP) . |
| 0073450 * | 3/1983 | (JP) . |
| 1-215879 * | 6/1983 | (JP) . |
| 58-103571 * | 6/1983 | (JP) . |
| 3026763 * | 2/1991 | (JP) . |
| 5-288910 | 11/1993 | (JP) . |
| 6-11607 | 1/1994 | (JP) . |
| 07-104272 | 4/1995 | (JP) . |
| 216328 | 8/1995 | (JP) . |
| 7-216328 | 8/1995 | (JP) . |
| WO 91/09719 | 7/1991 | (WO) . |
| WO 95/17303 | 6/1995 | (WO) . |
| WO 95/17691 | 6/1995 | (WO) . |
| WO 95/17692 | 6/1995 | (WO) . |
| WO 95/17699 | 6/1995 | (WO) . |

OTHER PUBLICATIONS

Alfrey, Jr. et al., "Physical Optics of Iridescent Multilayered Plastic Films", *Polymer Engineering and Science*, , vol. 9, No. 6, p. 400–404 (Nov. 1969).

Hodgkinson, I. et al., "Effective Principal Refractive Indices and Column Angles for Periodic Stacks of Thin Birefringent Films", *J. Opt. Soc. Am. A*, vol. 10, No. 9, p. 2065–71 (1993).

Im, J. et al., "Coextruded Microlayer Film and Sheet", *Journal of Plastic Film and Sheeting*, vol. 4, p. 104–15 (Apr., 1988).

Radford et al., "Reflectivity of Iridescent Coextruded Multilayered Plastic Films", "Reflectivity of Iridescent Coextruded Multilayered Plastic Films", *Polymer Engineering and Science*, vol. 13, No. 3, (May 1973).

(List continued on next page.)

*Primary Examiner*—Jeffrey G. Mullis
(74) *Attorney, Agent, or Firm*—Carolyn V. Peters

(57) ABSTRACT

A light diffusing adhesive comprising a mixture of a pressure-sensitive adhesive matrix having a refractive index of $n_1$ filled with organic, polymeric microparticles having a refractive index $n_2$, wherein the absolute difference in the refractive indices of matrix and microparticles, that is, $|n_1-n_2|$ is greater than zero and typically in the range of 0.01 to 0.2. The weight ratio of matrix to microparticles, based on solids, is from about 1:1 to about 50:1, preferably from about 4:1 to about 25:1.

7 Claims, No Drawings

U.S. PATENT DOCUMENTS

| | | | |
|---|---|---|---|
| 5,094,793 | 3/1992 | Schrenk et al. | 264/171 |
| 5,095,210 | 3/1992 | Wheatley et al. | 250/339 |
| 5,100,728 * | 3/1992 | Plamthottam | 428/435 |
| 5,103,337 | 4/1992 | Schrenk et al. | 359/359 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/587 |
| 5,149,578 | 9/1992 | Wheatley et al. | 428/213 |
| 5,170,287 | 12/1992 | Ludwig, Jr. et al. | 359/452 |
| 5,196,246 * | 3/1993 | Kauss et al. | 524/427 |
| 5,202,074 | 4/1993 | Schrenk et al. | 264/241 |
| 5,217,794 | 6/1993 | Schrenk | 428/220 |
| 5,233,465 | 8/1993 | Wheatley et al. | 359/359 |
| 5,234,729 | 8/1993 | Wheatley et al. | 428/30 |
| 5,237,004 * | 8/1993 | Wu | 525/85 |
| 5,237,641 | 8/1993 | Jacobson et al. | 385/146 |
| 5,269,995 | 12/1993 | Ramanathan et al. | 264/171 |
| 5,278,694 | 1/1994 | Wheatley et al. | 359/359 |
| 5,316,703 | 5/1994 | Schrenk | 264/1.3 |
| 5,339,198 | 8/1994 | Wheatley et al. | 359/359 |
| 5,360,659 | 11/1994 | Arends et al. | 428/216 |
| 5,389,324 | 2/1995 | Lewis et al. | 264/171 |
| 5,424,119 | 6/1995 | Phillips et al. | 428/328 |
| 5,448,404 | 9/1995 | Schrenk et al. | 359/584 |
| 5,451,449 | 9/1995 | Shetty et al. | 428/195 |
| 5,486,949 | 1/1996 | Schrenk et al. | 359/498 |
| 5,502,108 * | 3/1996 | Silver et al. | 525/77 |
| 5,540,978 | 7/1996 | Schrenk | 428/212 |
| 5,552,927 | 9/1996 | Wheatley et al. | 359/359 |
| 5,568,316 | 10/1996 | Schrenk et al. | 359/584 |
| 5,607,763 * | 3/1997 | Matsuda | 428/323 |
| 5,609,932 * | 3/1997 | Goetz et al. | 428/36.91 |

OTHER PUBLICATIONS

Schrenk, W. et al., "Coextruded Iridescent Film", TAPPI Paper Synthetics Conference, Atlanta, Georgia, p. 141–5 (Sep. 27–29 1976).

Schrenk et al., "Coextruded Multilayer Polymer Films and Sheet", Chapt. 15, Polymer Blends, vol. 2, 129, Academic Press, Inc. (1978).

Schrenk et al., "Interfacial Flow Instability in Multilayer Coextrusion", *Polymer Engineering and Science*, vol. 18 (8), p. 620–3 (Jun. 1978).

Schrenk, W. et al., "Coextruded Elastomeric Optical Interference Film", SPE Annual Technical Conference, Atlanta, GA p. 1703–7 (1988).

Schrenk, W. et al., "Coextruded Infrared Reflecting Films", 7th Annual Meeting Polymer Processing Society, Hamilton, Ontario, Canada, p. 222–3 (Apr. 1991).

Schrenk, W., "New Developments in Coextrusion", International Conference on Advances In Polymer Processing, New Orleans, LOuisiana, (Apr., 1991).

JAPFO Abstract of JP06–126202 Nov. 1986.

* cited by examiner

LIGHT DIFFUSING ADHESIVE

CROSS-REFERENCES TO RELATED APPLICATIONS

This application is a continuation of U.S. application, Ser. No. 08/565,111, filed Nov. 30, 1995, now abandoned, which claims the benefit of U.S. Provisional Application, No. 60/000,512, filed Jun. 26, 1995.

TECHNICAL FIELD

The present invention relates to light diffusing material, in particular to light diffusion adhesive having excellent light diffusing properties with low back scattering.

BACKGROUND OF THE INVENTION

Information displays, such as liquid crystal displays and rear projection screens, often rely on light-diffusing optical constructions for efficient operation and enhanced readability. Such light-diffusing constructions assume critical roles in these displays by forward scattering the light from a source without a significant loss in the intensity of the forward scattered light. This scattered, yet high transmittance, resultant light gives such displays a desirable background brightness by reducing the amount of incident light which is scattered or reflected back toward the light source. Elimination or restriction of such "backscattered" light is a key factor in designing these light-diffusing constructions.

One approach in designing light-diffusing constructions is the filling or embedding of rigid, transparent or translucent plastic films with particles. When properly sized, prepared and formulated with a plastic film, these particles can scatter and diffuse incident light. However, the use of some particles can lead to certain undesirable and deleterious optical effects which detract from the overall brightness or transmittance of the incident light. For example, when some inorganic particles such as titania powders or if particles which are too small (i.e., on the order of the wavelength of the incident light) are used in light-diffusing constructions, a significant loss in brightness can result clue to high levels of backscatter. Conversely, particles having a large diameter with respect to the wavelength of the incident light and/or if the refractive index of the particles is identical or very similar with the continuous plastic film, then little light diffusion occurs.

Additionally, some particle-filled plastic films, although effective as light-diffusing layers, can alter the polarity of the light as it travels through the film. In some constructions, for example, liquid crystal displays, any significant depolarization of the light by the light-diffusing film or component can result in the loss of image quality.

SUMMARY OF THE INVENTION

Briefly, in one aspect of the invention a light diffusing adhesive is provided comprising a mixture of a pressure-sensitive adhesive matrix having a refractive index of $n_1$ filled with organic, polymeric microparticles having a refractive index $n_2$, wherein the absolute difference in the refractive indices of matrix and microparticles, that is, $|n1-n2|$ is greater than zero and typically in the range of 0.01 to 0.2. The weight ratio of matrix to microparticles, based on solids, is from about 1:1 to about 50:1, preferably from about 4:1 to about 25:1.

Advantageously, the adhesive matrix can be both water and solvent borne thus permitting greater flexibility in choice of adhesive for controlling optical performance. Further, the adhesive matrix can be a film former or microsphere based. Light diffusing microparticles used in the present invention can be prepared using a variety of polymerization methods, allowing the user more opportunity to control the size, composition, morphology and overall characteristics of the microparticles.

Furthermore, the proper balance of particle sizes, particle compositions, refractive indices, particle loadings and other properties and parameters can be tailored to adjust light diffusing properties according to an intended end-use. Attachment or adherence of such light diffusing adhesives to other polarizing films, reflective substrates or other optical components is also provided by this invention. Due to the adhesive nature of these light diffusing materials, there is no need for additional layers of adhesive for laminating or bonding for surface attachment to substrates that could be detrimental to the optical performance of the light management device. Additionally, this invention provides a material that is not only light diffusing but is flexible, as well.

Advantageously, the light diffusing adhesive of the present invention does not significantly backscatter incident light or de-polarize transmitted light.

DESCRIPTION OF THE PREFERRED EMBODIMENT(S)

The light diffusing adhesive of the present invention comprises a mixture of a pressure-sensitive adhesive matrix having a refractive index of $n_1$ filled with organic, polymeric microparticles having a refractive index $n_2$, wherein the absolute difference in the refractive indices of matrix and microparticles, that is, $|n1-n2|$ is greater than zero and is typically in the range of 0.01 to 0.2.

The weight ratio of matrix to microparticles, based on solids, is from about 1:1 to about 50:1, preferably from about 4:1 to about 25:1. While many factors can affect the light diffusing properties of the adhesives of the present invention, the ratio of the matrix to microparticles is a significant factor. Generally, when the ratio of matrix to microparticles is too large, there is an insufficient concentration of particles to adequately diffuse incident light and a thicker film is required. On the other hand, when microparticle concentration goes beyond 50% of the matrix, brightness and transmittance deteriorates.

Other factors that can affect the light diffusing characteristics of the adhesive include for example, the microparticle size, the refractive index differential between the matrix and the microparticles, the gradient in refractive index between the matrix and the microparticles, the thickness of the dried light diffusing adhesive when coated onto a substrate, and the intrinsic properties of the microparticle components, for example, degree of crystallinity, organic or inorganic character, absorption properties and the like.

To obtain the optical properties in this light diffusing adhesive layer, the absolute difference between the refractive index of the pressure-sensitive adhesive matrix ($n_1$) and the microparticle filler ($n_2$) is greater than zero and is typically in the range of 0.01 to 0.2. Values for refractive indices of these components can be obtained directly through the use of standard refractometric methods (for example, using an Abbe refractometer according to ASTM Test Method D542) or, more conveniently, by consulting various tabular sources of refractive index data for polymeric materials (for example, Polymer Handbook, 3rd. ed., New York, John Wiley & Sons, 1989. pp. VI/451–VI/461).

Should this absolute difference in refractive indices approach zero, then a poorly- or non-diffusing transparent or nearly transparent composite could result. This insufficient differential of the refractive indices might be overcome by adding more particles and/or increasing the thickness of the adhesive layer. However, these corrective measures could result in an adhesive layer having diminished brightness.

The adhesive layer is light-diffusing in nature: that is, the adhesive layer can bend the incident light beam, yet still retain a high level of transmittance (generally greater than about 80% of incident intensity, preferably about 85% to about 95%, most preferably about 90% to about 95%) after passing through the adhesive layer. Furthermore, backscatter of these adhesives is typically less than about 20%, preferably in the range of about 1 to about 10%.

In general, light diffusing materials have the ability to uniformly scatter light forward from the light source. Uniformity of the scattered light is measured in terms of its bend angle, wherein "bend angle" means the viewing angle at which the gain drops to ⅓ of its on-axis value. The larger the bend angle, the more uniform the scattered light. However, higher bend angles usually come at the expense of brightness (luminous transmission). Alternatively, losses in luminous transmission could be due to excessive backscattered light. Thus, optimization of light diffusing material depends on the balance between particle concentration, index of refraction difference, thickness of the diffuser and particle size.

The pressure-sensitive adhesive matrix is defined as an adhesive material that is aggressively tacky at room temperature, for example, about 20 to 22° C. and firmly adheres to a variety of dissimilar surfaces upon mere contact without the need of more than finger or hand pressure, yet has a sufficiently cohesive and elastic nature so that, despite its aggressive tackiness, can be handled with the fingers and removed from smooth surfaces without leaving a residue (Pressure-Sensitive Tape Council Test Methods, 1985, p. 5). Such adhesives may be inherently tacky or may be elastomeric materials compounded with compatible tackifying resins. Furthermore, these adhesive matrices can be film forming compositions or tacky microspheres. The pressure-sensitive adhesive matrix can be formed by a variety of polymerization methods, including solution, suspension, emulsion and bulk techniques. Examples of useful pressure-sensitive adhesive matrix compositions include but are not limited to (meth)acrylates, tackified silicones, and tackified styrene-isoprene or tackified styrene-butadiene block copolymers.

A preferred class of pressure-sensitive adhesive matrices are film-forming (meth)acrylates compositions due to their ready availability, ease of preparation and formulation, and superior optical properties and stability. A consideration in the selection of the matrix is the compatibility of this matrix with the microparticles. For example, matrices comprising water-borne (meth)acrylic emulsions or latices are particularly compatible with water-based microparticles prepared by suspension or emulsion techniques. Likewise, solvent-borne matrices tend to be more compatible with microparticles prepared out of non-aqueous media.

Another preferred class of pressure-sensitive adhesive matrices are pressure-sensitive adhesive microspheres having a diameter of about 0.5 µm to about 150 µm, preferably about 1 µm to about 70 µm, most preferably about 2 µm to about 30 µm. Such microsphere matrices can be prepared by suspension, dispersion, direct emulsion and modified emulsion techniques. Preferably, pressure-sensitive adhesive microsphere matrices are prepared according to suspension polymerization methods described in, for example, U.S. Pat. No. 3,691,140 (Silver); U.S. Pat. No. 4,166,152 (Baker et al.); U.S. Pat. No. 4,495,318 (Howard); U.S. Pat. No. 4,786,696 (Bohnel); U.S. Pat. No. 4,988,467 (Delgado); and U.S. Pat. No. 5,045,569 (Delgado) and PCT Appl. No. WO 94/13751 (Delgado et al.).

In the preferred suspension polymerization method, the organic, polymeric microspheres can be prepared by first forming an oil-in-water emulsion of an oil phase comprising any hydrophobic monomers, for example methacrylate monomers and an oil soluble initiator in a water phase which comprises an aqueous medium having at least one suspension stabilizer or surfactant, such as those surfactants known to those skilled in the art. These suspension polymerization processes can optionally include other free radically reactive starting materials and are typically performed in the presence of a variety of emulsifiers, stabilizers, surfactants and/or under particular process conditions that induce the formation and prevent the agglomeration of the microspheres. Advantageously, microspherical matrices can be combined with microparticles to form repositionable light diffusing adhesives.

The preferred pressure-sensitive adhesive matrix formulations are typically provided from alkyl (meth)acrylate monomers. Particularly preferred monomers are monofunctional unsaturated (meth)acrylate esters of non-tertiary alkyl alcohols. The alkyl groups of these alcohols typically contain from 4 to 14, preferably 4 to 10 carbon atoms. As homopolymers, these (meth)acrylate esters generally have glass transition temperatures of below about 10° C.

Examples of useful monomers include but are not limited to sec-butyl acrylate, n-butyl acrylate, isoamyl acrylate, 2-methylbutyl acrylate, 4-methyl-2-pentyl acrylate, 2-ethylhexyl acrylate, isooctyl acrylate, isononyl acrylate, isodecyl methacrylate, dodecyl acrylate, tetradecyl acrylate and mixtures thereof. Of these, isooctyl acrylate, n-butyl acrylate and 2-ethylhexyl acrylate are preferred.

(Meth)acrylate or other vinyl monomers which, as homopolymers, have glass transition temperatures of greater than about −20 to 0° C., for example, ethyl acrylate, tert-butyl acrylate, isobornyl acrylate, butyl methacrylate, vinyl acetate, acrylonitrile, and the like, may be used in conjunction with one or more of the (meth)acrylate monomers provided that the glass transition temperature of the resulting polymer is below about −10° C. and has the proper pressure sensitive adhesive and optical properties.

Free radically polymerizable polar monomers are also useful in the matrices of the present invention. These polar monomers are both somewhat oil-soluble and water-soluble. Representative examples of suitable polar monomers include but are not limited to those selected from the group consisting of acrylic acid, methacrylic acid, itaconic acid, crotonic acid, maleic acid, fumaric acid, sulfoethyl methacrylate, N-vinyl pyrrolidone, N-vinyl caprolactam, 2-vinyl-4,4-dimethyl-2-oxazolidinone, t-butyl acrylamide, dimethyl amino ethyl acrylamide, N-octyl acrylamide, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxyethyl) ammonium propionate betaine, trimethylamine methacrylimide, 1,1-dimethyl-1-(2,3-dihydroxypropyl)amine methacrylimide, mixtures thereof, and the like. Preferred polar monomers include those selected from the group consisting of monoolefinic monocarboxylic acids, monoolefinic dicarboxylic acids, acrylamides, N-substituted acrylamides, salts thereof, and mixtures thereof. Examples of such preferred polar monomers include but are not limited to those selected from the group consisting of acrylic acid, sodium acrylate, N-vinyl pyrrolidone, and mixtures thereof.

These adhesive matrices may or may not be crosslinked. Preferred (meth)acrylate matrices can be crosslinked using multifunctional crosslinking agents. Useful multifunctional crosslinking agents include but are not limited to those selected from the group consisting of acrylic or methacrylic esters of diols such as butanediol diacrylate, triols such as glycerol, and tetrols such as pentaerythritol. Other useful crosslinking agents include but are not limited to those selected from the group consisting of polyvinylic crosslinking agents, such as substituted and unsubstituted divinylbenzene; and difunctional urethane acrylates, such as Ebecryl™ 270 and Ebecryl™ 230 (1500 weight average molecular weight and 5000 weight average molecular weight acrylated urethanes, respectively—both available from Radcure Specialties), and mixtures thereof.

When used, crosslinker(s) is (are) added at a level consistent with their known use and the retention of pressure sensitive adhesive properties. Such factors that are considered include but are not limited to molecular weight of the crosslinker, degree of multifunctionality, the crosslinker concentration, and the like. Crosslinking can alternatively occur via exposure to an appropriate energy source, such as gamma or electron beam radiation.

The microparticles of the light diffusing adhesive of the present invention are polymeric and can be prepared by a number of well-known techniques, such as, suspension, dispersion, direct emulsion and modified emulsion polymerizations. The microparticles typically have a diameter of about 0.5 $\mu$m to about 30 $\mu$m, preferably about 1 $\mu$m to about 15 $\mu$m, most preferably about 2 $\mu$m to about 10 $\mu$m.

To meet the refractive index differential with preferred acrylate pressure sensitive adhesive matrices, which typically have refractive indices of about 1.46 to about 1.48, organic, polymeric microparticles having somewhat lower or higher refractive indices are essential. Microparticles having a sufficiently lower index of refraction than these preferred acrylate pressure sensitive adhesive matrices can be prepared from fluorinated acrylate or methacrylate monomers. Such fluorinated (meth)acrylate monomers form polymers having refractive indices in the range of about 1.34 to about 1.44 depending on the chain length and/or degree of branching of the fluoroalkyl substituents of these monomers. Examples of useful fluorinated acrylate or methacrylate monomers include pentadecafluorooctyl acrylate, unadecafluorohexyl acrylate, nonafluoropentyl acrylate, heptafluorobutyl acrylate, octafluoropentyl acrylate, pentafluoropropyl acrylate, trifluoroacrylate, triisofluoroisopropyl methacrylate, and trifluoroethyl methacrylate.

Conversely, microparticles having a sufficiently higher index of refraction than these preferred acrylate pressure sensitive adhesive matrices can be preferably prepared from free radically polymerizable monomers having cycloaliphatic, substituted cycloaliphatic, aromatic or substituted aromatic substituents. The homopolymers of such free radically polymerizable monomers generally have refractive indices in the range of about 1.49 to about 1.63. Useful examples of such free radically polymerizable monomers include 3-methylcyclohexyl methacrylate, 4-methylcyclohexyl methacrylate, 2-methylcyclohexyl methacrylate, bornyl methacrylate, cyclohexyl methacrylate, 1-methylcyclohexyl methacrylate, 2-chlorocyclohexyl methacrylate, benzyl methacrylate, phenoxy methacrylate, polyphenyl methacrylate, α-methyl styrene, styrene, vinyl neononate, halogenated methacrylates, 2-chlorocyclohexyl methacrylate, 2-bromoethyl methacrylate and the like.

These microparticles may or may not be crosslinked. Preferred (meth)acrylate microparticles can be crosslinked using multifunctional crosslinking agents. Useful multifunctional crosslinking agents include but are not limited to those selected from the group consisting of acrylic or methacrylic esters of diols such as butanediol diacrylate, triols such as glycerol, and tetrols such as pentaerythritol. Other useful crosslinking agents include but are not limited to those selected from the group consisting of polyvinylic crosslinking agents, such as substituted and unsubstituted divinylbenzene; and difunctional urethane acrylates, such as Ebecryl™ 270 and Ebecryl™ 230 (1500 weight average molecular weight and 5000 weight average molecular weight acrylated urethanes, respectively—both available from Radcure Specialties), and mixtures thereof.

When used, crosslinker(s) is (are) added at a level consistent with their known use and the desired physical and optical properties. Such factors that are considered include but are not limited to molecular weight of the crosslinker, degree of multifunctionality, the crosslinker concentration, and the like. Crosslinking can alternatively occur via exposure to an appropriate energy source, such as gamma or electron beam radiation.

The pressure sensitive adhesive matrix can be coated on suitable flexible or inflexible backing materials by conventional coating techniques such as knife coating or Meyer bar coating or use of an extrusion die.

Suitable backing materials for the aqueous or solvent based coatings include but are not limited to those selected from the group consisting of paper, plastic films, cellulose acetate, ethyl cellulose, woven or nonwoven fabric formed of synthetic or natural materials, metal, metallized polymeric film, ceramic sheet material, and the like. Primers or binders may be used thereon.

The pressure-sensitive adhesive properties of the light diffusing adhesives may be altered by addition of tackifying resin and/or plasticizer. It is also within the scope of this invention to include various other components, such as colorants, neutralizing agents such as sodium hydroxide, etc., fillers, stabilizers, or various polymeric additives. The amounts of these additional components are added to the pressure sensitive adhesive matrix in an amount consistent with the known uses of these components.

When the light diffusing adhesive of the present invention is used in combination with suitable backings and substrates, a variety of optical devices can be obtained. Such devices include but are not limited to, sign boards, illumination covers, partitions, decorative films, films for rear projection screens, conformable films, skylights, and the like. The foregoing list of articles is by no means exhaustive and should not be construed to limit the scope of this invention.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

Test Methods

Bend Angle

The attenuation of on-axis gain and angular spread caused by the light diffusing adhesive was measured using a HeNe laser used in a transmission geometry. A Beamscan scanning system with a 25 μm aperture was used as the detector that scanned the scattered beam in the vertical plane. The bend angle is defined as the viewing angle at which the gain dropped to ⅓ of its on-axis value.

Luminous Transmission

The luminous transmission of the light diffusing adhesive layer was measured using a Perkin-Elmer Lambda-19 Spectrophotometer in transmission mode.

Depolarization

The ability of the diffusing adhesives to depolarize light was measured using a Perkin-Elmer Lambda-19 Spectrophotometer with one dichroic polarizer placed at the beam entrance slit and other sheet placed immediately before the integrating sphere in which light is collected. The diffusing adhesive was placed between the polarizers, which were crossed. If the diffusing adhesive affects the state of polarization of the light, then, an increase in the transmission would be observed. The averaged deviation from total extinction over the visible range (400–700 nm) is reported.

Backscatter

The backscatter in the light diffusing adhesive was characterized with a Perkin-Elmer Lambda-19 Spectrophotometer. The sample was placed in reflective mode with a black backing behind it to absorb transmitted light. An integrating sphere was used to measure both specutarly and diffusely reflected light. First surface reflection are subtracted from the reported values. The backscattered light was measured as a function of wavelength over the visible range (400–700 nm) and the average deviation is reported.

Index of Refraction

A Metricon prism coupler was used to determine the indices of refraction of these adhesives at a wavelength of 632.8 nm. Indices were measured in the x, y and z direction, but were found to be the same in all directions.

Preparation of the Organic, Polymeric Microparticles

EXAMPLE 1

Preparation of Waterborne Poly(styrene) Particles by Suspension Polymerization Method 6 grams of Standapol™ A (ammonium lauryl sulfate commercially available from Hercules, Inc.) and 3 grams of poly(vinyl alcohol) were dissolved in 240 grams of deionized water. 2 grams of Lucidol™75 (75% benzoyl peroxide from Elf Atochem) was dissolved in 150 grams of styrene and then charged to the above aqueous mixture. The above mixture was emulsified in a Gaulin homogenizer such that the styrene monomer droplet size was 1 micron or less. This emulsion was then charged to 1 liter reactor, stirred at 300 RPM and heated to 70° C. for 16 hours. The resulting particle size was approximately 2 microns as viewed with an optical microscope and had an index of refraction of 1.59.

EXAMPLE 1A

Preparation of Waterborne Poly(NEO-9) Particles by Suspension Polymerization Method 7 grams of Standapol™ A (ammonium lauryl sulfate commercially available from Hercules, Inc.) and 1 gram of poly(vinyl alcohol) were dissolved in 390 grams of deionized water. 1 gram of lauryl peroxide, 2.1 grams of acrylic acid and 2.1 grams of 1,6 hexanediol diacrylate were dissolved in 205.8 grams of vinyl neononate (commercially available from Union Carbide under the tradename "NEO-9") and then charged to the above aqueous mixture. The above mixture was emulsified in a Gaulin homogenizer such that the styrene monomer droplet size was 1 micron or less. This emulsion was then charged to 0.5 liter reactor, stirred at 300 RPM and heated to 60° C. for 8 hours. The resulting particle size was approximately 2 microns as viewed with an optical microscope and had an index of refraction of 1.49.

EXAMPLE 1B

Preparation of Waterborne Poly (Benzyl Methacrylate) Particles by Suspension Polymerization Method 5 grams of Standapol™ A (ammonium lauryl sulfate commercially available from Hercules, Inc.) and 1.5 grams of PVP-K90 (poly(vinyl pyrrolidone) commercially available from GAF) were dissolved in 480 grams of deionized water. 0.47 grams of lauryl peroxide was dissolved in 128 grams benzyl methacrylate and then charged to the above aqueous mixture. The above mixture was emulsified in a Gaulin homogenizer such that the styrene monomer droplet size was 1 micron or less. This emulsion was then charged to 1 liter reactor, stirred at 300 RPM and heated to 65° C. for 5 hours. The resulting particle size was approximately 2 microns as viewed with an optical microscope and had an index of refraction of 1.57.

EXAMPLE 2

Preparation of Solventborne Poly(styrene) Particles by Dispersion Polymerization Method 9 grams of PVP-K15 (a poly(vinyl pyrrolidone) stabilizer commercially available from GAF, Inc.) and 1.5 grams of Aersol™ OT100 (sodium dioctyl sulfosuccinate commercially available from American Cyanamid) were dissolved in 195 grams of ethanol. 2.1 grams of Vazo™ 64 (2,2'-azobis (isobutyronitrile) from Dupont) and 1.05 grams of 1,6-hexanediol diacrylate were dissolved in 105 grams of styrene. The two mixtures were combined and than charged to 0.5 liter reactor, stirred at 250 RPM and heated to 70° C. for 16 hours. The resulting particle size was approximately 9 microns as viewed with an optical microscope and had an index of refraction of 1.59.

Table 1 below lists the index of refraction of the diffusing particles:

TABLE 1

| Polymer | $n_a$ |
|---|---|
| poly(styrene) | 1.59 |
| poly(benzyl methacrylate) | 1.568 |
| poly(NEO-9)* | 1.49 |

*Neo-9 is a C-9 branched vinyl ester from Union Carbide

Preparation of Pressure-Sensitive Adhesive Matrix Microparticles

EXAMPLE 3

Preparation of Pressure-Sensitive Adhesive Matrix Microspheres by Suspension Polymerization Method 1 gram of sodium dodecyl benzene sulfonate and 2.4 grams of sodium styrene sulfonate (NaSS) were dissolved in 360 grams of deionized water. 7.2 grams of poly(ethylene oxide)$_{16}$ acrylate (PEO) and 1.05 grams of Lucidol™75 (75% benzoyl peroxide from Elf Atochem) were dissolved in 230.4 grams of isooctyl acrylate (IOA). The above mixture was emulsified in a Gaulin homogenizer such that the droplet size was 1 micron or less. This emulsion was then charged to 1 liter reactor, stirred at 400 RPM and heated to 65° C. for 4 hours. The 96/3/1 IOA/PEO/NaSS resulting particles had a size of approximately 2 microns as viewed with an optical microscope and had an index of refraction of 1.47.

EXAMPLE 4
Preparation of Pressure-Sensitive Adhesive Matrix Microspheres by Suspension Polymerization Method Microspheres containing acrylic acid (AA) in a 97/2/1 IOA/PEO/AA weight ratio were prepared in accordance with Example 3. The resulting microspheres had a size of approximately 2 microns as viewed with an optical microscope and had an index of refraction of 1.47.

EXAMPLE 5
Preparation of Pressure-Sensitive Adhesive Matrix Microsphere by Suspension Polymerization Method Microspheres containing hydroxybutyl acrylate (HBA) in a 96/2/2 IOA/PEO/HBA weight ratio were prepared in accordance with Example 3. The resulting particles had a size of approximately 2 micrometers as viewed with an optical microscope and had an index of refraction of 1.469.

Commercially Available Pressure-Sensitive Adhesive Matrices

Table 2 lists the tradename, supplier, and index of refraction of the acrylic emulsion pressure-sensitive adhesive matrices used in the following examples.

TABLE 2

| Matrix | Tradename | Supplier | $n_a$ |
|---|---|---|---|
| A | Rhodotak ™ 300 | Rhone-Poulenc | 1.468 |
| B | Morstik ™ 214 | Morton Adhesives | 1.47 |
| C | UCAR ™ 965 | Union Carbide | 1.494 |
| D | Flexcryl ™ 1625 | Air Products | 1.471 |

EXAMPLES 6–9
Light-Diffusing Adhesive Compositions Using Acrylic Emulsion Pressure-Sensitive Adhesive Matrices combined with Poly(styrene) Microparticles A series of light-diffusing adhesive compositions were prepared by blending 10% by weight of the organic, polymeric microparticles of Example 1 with several acrylic emulsion pressure-sensitive adhesive matrices. Once blended, the light diffusing adhesive compositions were coated onto PET at 4 mils wet and dried at 60° C. for 10 minutes. Following drying, the luminous transmission, bend angle, backscatter and depolarization for the light-diffusing adhesive compositions were measured as described above and the results of these measurements are reported in Tables 3a and 3b.

TABLE 3a

| Example | Matrix (wt %) | Microparticle (wt %) | Luminous Transmission |
|---|---|---|---|
| 6 | A(90) | Ex. 1(10) | 87.2% |
| 7 | B(90) | Ex. 1(10) | 86.6% |
| 8 | C(90) | Ex. 1(10) | 91.5% |
| 9 | D(90) | Ex. 1 (10) | 89.4% |

TABLE 3b

| Example | Bend Angle | Backscattter (%) | Depolarization (% Extinction) |
|---|---|---|---|
| 6 | 4.68 | 4.65 | 7.36 |
| 7 | 5.75 | 5.27 | 0.57 |
| 8 | 5.05 | 1.75 | 1.62 |
| 9 | 5.0 | 4.82 | 0.67 |

EXAMPLES 10–13 AND COMPARATIVE EXAMPLE C-1: LIGHT-DIFFUSING ADHESIVE COMPOSITIONS USING MICROSPHERE PRESSURE-SENSITIVE ADHESIVE MATRICES COMBINED WITH POLY(STYRENE) MICROPARTICLES

Examples 10–13 illustrate the use of the organic, polymeric microparticles of Example 1 mixed in a matrix comprising the pressure-sensitive adhesive microspheres of Example 3 at varying weight ratios. The microparticle/matrix mixtures were blended, coated and dried as described in Examples 6–9 and the luminous transmission, bend angle, backscatter and depolarization for the light-diffusing adhesive compositions were measured as described above. The results of these measurements and the results of similar measurements on a coating solely comprising the microsphere matrix of Example 3 (Comparative Example C1) are reported in Tables 4a and 4b.

TABLE 4a

| Example | Matrix (wt %) | Microparticle (wt %) | Luminous Transmission |
|---|---|---|---|
| 10 | Ex. 3(95) | Ex. 1(5) | 90.4% |
| 11 | Ex. 3(93) | Ex. 1(7) | 90.3% |
| 12 | Ex. 3(90) | Ex. 1(10) | 88.7% |
| 13 | Ex. 3(80) | Ex. 1 (20) | 84.2% |
| C1 | Ex. 3(100) | — | 92.6% |

TABLE 4b

| Example | Bend Angle | Backscattter (%) | Depolarization (% Extinction) |
|---|---|---|---|
| 10 | 3.7 | 2.76 | 1.4 |
| 11 | 4.55 | 2.12 | 0.53 |
| 12 | 5.73 | 4.76 | 1.52 |
| 13 | 6.95 | 6.55 | 0.24 |
| C1 | 2.4 | 0.76 | 1.27 |

EXAMPLES 14–16 AND COMPARATIVE EXAMPLES C-2–C-4: LIGHT-DIFFUSING ADHESIVE COMPOSITIONS USING MICROSPHERE PRESSURE-SENSITIVE ADHESIVE MATRICES COMBINED WITH VARIOUS ORGANIC, POLYMERIC MICROPARTICLES

Examples 14–16 illustrate the use of the organic, polymeric microparticles of Example 1, 1A and 1B mixed in a matrix comprising the pressure-sensitive adhesive microspheres of Example 3–5 at varying weight ratios. The microparticle/matrix mixtures were blended, coated and dried as described in Examples 6–9 the luminous transmission, bend angle, backscatter and depolarization for the light-diffusing adhesive compositions were measured as described above. The results of these measurements, and the results of similar measurements on a coating solely comprising the microsphere matrices of Example 3–5

(Comparative Example C2–C4), are reported in Tables 5a and 5b.

TABLE 5a

| Example | Matrix (wt %) | Microparticle (wt %) | Luminous Transmission |
|---|---|---|---|
| 14 | Ex. 3(91) | Ex. 1A(9) | 93.1% |
| C2 | Ex. 3(100) | Ex. 1A(0) | 92.6% |
| 15 | Ex. 4(96) | Ex. 1(4) | 94.4% |
| C3 | Ex. 4(100) | Ex. 1 (0) | 93.4% |
| 16 | Ex. 5(70) | Ex. 1B (30) | 83.5% |
| C4 | Ex. 5(100) | Ex. 1B | 92.7% |

TABLE 5b

| Example | Bend Angle | Backscattter (%) | Depolarization (% Extinction) |
|---|---|---|---|
| 14 | 2.52 | 0.91 | 4.4 |
| C2 | 2.40 | 0.76 | 1.27 |
| 15 | 3.90 | 1.13 | 2.4 |
| C3 | 2.60 | 1.11 | 5.0 |
| 16 | 6.40 | 5.95 | 7.63 |
| C4 | 2.3 | 1.15 | 4.27 |

EXAMPLES 17–19 AND COMPARATIVE EXAMPLES C5–C7: LIGHT-DIFFUSING ADHESIVE COMPOSITIONS USING SOLVENT-BORNE ACRYLIC PRESSURE-SENSITIVE ADHESIVE MATRICES COMBINED WITH ORGANIC POLYMERIC MICROPARTICLES AND INORGANIC POLYMERIC MICROPARTICLES

This set of examples show that the use of an inorganic particle (titanium dioxide) resulted in higher deviations from total extinction (depolarization) and backscatter than analogous light-diffusing adhesive compositions which employed organic, polymeric microparticles. Light-diffusing adhesives were prepared from both the dispersion polymerized poly(styrene) particles of Example 2 and titanium dioxide particles at three particle concentrations in Aroset™ 1085 (pressure sensitive adhesive matrix), a solvent based acrylic pressure sensitive adhesive having a refractive index of 1.468 commercially available from Ashland Chemicals. The microparticle/matrix mixtures were blended, coated and dried as described in Examples 6–9, except the mixtures were coated onto a release liner. Once dried, the backscatter and depolarization for the light-diffusing adhesive compositions were measured as described above. The results of these measurements are reported in Table 6.

TABLE 6

| Example | Matrix (wt %) | Microparticles (wt %) | Backscatter (%) | Depolarization (% Extinction) |
|---|---|---|---|---|
| 17 | 95 | Ex. 1 (5) | 11.18 | 6.32 |
| C5 | 95 | TiO$_2$ (5) | 18.44 | 9.18 |
| 18 | 90 | Ex. 1 (10) | 13.82 | 5.38 |
| C6 | 90 | TiO$_2$ (10) | 29.09 | 10.19 |
| 19 | 80 | Ex. 1 (20) | 18.44 | 9.18 |
| C7 | 80 | TiO$_2$ (20) | 35.57 | 14.89 |

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

In the claims:

1. A light diffusing adhesive comprising a pressure sensitive adhesive matrix having a refractive index of $n_1$ filled with organic polymeric microparticles having an average diameter of about 0.5 µm to about 30 µm and having a refractive index of $n_2$, such that $|n_1-n_2|$ is in the range of 0.01 to 0.2 and the combination of the pressure sensitive adhesive matrix and organic polymeric microparticles has a transmittance of greater than 80% of incident intensity and a backscatter of less than 20%, wherein pressure sensitive adhesive matrix is a film former or a pressure sensitive microsphere-based adhesive composition and the organic polymeric microparticles are prepared from fluorinated acrylate monomers or fluorinated methacrylate monomers having refractive indices in the range of about 1.34 to about 1.44.

2. The light diffusing adhesive according to claim 1, wherein the adhesive is comprised of a mixture having a weight ratio of pressure sensitive adhesive matrix to organic polymeric microparticles, based on solids, is about 1:1 to about 50:1.

3. The light diffusing adhesive according to claim 1, wherein the pressure-sensitive adhesive matrix are pressure-sensitive adhesive microspheres having a diameter of about 0.5 µm to about 150 µm.

4. The light diffusing adhesive according to claim 1, wherein the fluorinated acrylate or methacrylate monomers are pentadecafluorooctyl acrylate, unadecafluorohexyl acrylate, nonafluoropentyl acrylate, heptafluorobutyl acrylate, octafluoropentyl acrylate, pentafluoropropyl acrylate, trifluoroacrylate, triisofluoroisopropyl methacrylate, or trifluoroethyl methacrylate.

5. The light diffusing adhesive according to claim 1, wherein the film forming pressure sensitive adhesive matrix is (meth)acrylate compositions, tackified silicones, tackified styrene-isoprene or tackified styrene-butadiene block copolymers.

6. The light diffusing adhesive according to claim 5, wherein the pressure sensitive adhesive matrix are polymers provided from alkyl (meth)acrylate esters of non-tertiary alkyl alcohols, wherein the alkyl groups of the alcohols contain from 4 to 14 carbon atoms.

7. The light diffusing adhesive according to claim 6, wherein the alkyl (meth)acrylate esters of non-tertiary alkyl alcohols are isooctyl acrylate, n-butyl acrylate, 2-ethylhexyl acrylate or mixtures thereof.

* * * * *

UNITED STATES PATENT AND TRADEMARK OFFICE
CERTIFICATE OF CORRECTION

PATENT NO.     : 6,288,172 B1
DATED          : September 11, 2001
INVENTOR(S)    : Goetz, Richard J.

It is certified that error appears in the above-identified patent and that said Letters Patent is hereby corrected as shown below:

Title page,
Item [56], References Cited, U.S. PATENT DOCUMENTS, please add:
-- 4,504,642    3/85    Ohmori et al.    526/246
4,720,416    1/88    Duncan    428/195
5,667,303    9/97    Arens et al.    374/102
5,736,228    4/98    Morris et al.    428/195 --
OTHER PUBLICATIONS, please insert
-- PAJ & Derwent WPI Abstracts of JP-A-6059107. --

Column 1,
Line 42, delete "clue" and insert in place thereof -- due --.

Column 12,
Line 26, insert -- which form polymers -- preceding "having".

Signed and Sealed this

Twenty-fourth Day of September, 2002

Attest:

JAMES E. ROGAN
Attesting Officer     Director of the United States Patent and Trademark Office